United States Patent
Van Wambeke et al.

(10) Patent No.: US 9,942,141 B2
(45) Date of Patent: Apr. 10, 2018

(54) DATA COMMUNICATION METHOD BETWEEN A ROAMING RADIO EQUIPMENT ITEM AND A NETWORK ACCESS GATEWAY

(71) Applicant: THALES, Courbevoie (FR)

(72) Inventors: Nicolas Van Wambeke, Toulouse (FR); Benjamin Gadat, Toulouse (FR)

(73) Assignee: THALES, Courbevoie (FR)

( * ) Notice: Subject to any disclaimer, the term of this patent is extended or adjusted under 35 U.S.C. 154(b) by 190 days.

(21) Appl. No.: 14/933,924

(22) Filed: Nov. 5, 2015

(65) Prior Publication Data
US 2016/0149809 A1    May 26, 2016

(30) Foreign Application Priority Data
Nov. 21, 2014 (FR) .................................. 14 02624

(51) Int. Cl.
| | |
|---|---|
| *H04L 12/741* | (2013.01) |
| *H04L 29/06* | (2006.01) |
| *H04L 12/46* | (2006.01) |
| *H04W 84/00* | (2009.01) |
| *H04L 29/08* | (2006.01) |
| *H04W 28/06* | (2009.01) |

(52) U.S. Cl.
CPC .......... *H04L 45/74* (2013.01); *H04L 12/4633* (2013.01); *H04L 69/04* (2013.01); *H04L 69/22* (2013.01); *H04L 69/324* (2013.01); *H04L 69/325* (2013.01); *H04W 84/005* (2013.01); *H04L 69/16* (2013.01); *H04W 28/06* (2013.01)

(58) Field of Classification Search
CPC ....... H04L 69/16; H04L 69/22; H04L 69/325; H04L 69/324; H04L 45/74; H04L 12/4633; H04L 69/04; H04W 28/06; H04W 84/005
See application file for complete search history.

(56) References Cited

U.S. PATENT DOCUMENTS

| | | | |
|---|---|---|---|
| 7,215,667 B1* | 5/2007 | Davis ................. | H04L 12/4633 370/389 |
| 2004/0001508 A1* | 1/2004 | Zheng ................ | H04L 12/4633 370/466 |
| 2005/0089024 A1* | 4/2005 | Bergeron ............. | H04L 12/66 370/352 |

FOREIGN PATENT DOCUMENTS

| | | |
|---|---|---|
| EP | 2 007 078 A1 | 12/2008 |
| WO | 2008/152535 A1 | 12/2008 |

* cited by examiner

*Primary Examiner* — Charles C Jiang
*Assistant Examiner* — Kyaw Z Soe
(74) *Attorney, Agent, or Firm* — Baker & Hostetler LLP

(57) ABSTRACT

A data communication method between a mobile radio communications equipment and a gateway connected to a network, the data being organized in the form of packets comprising at least one first internal header and a second external header, comprises: an initial information exchange phase comprising: transmission by the radio communications equipment to the gateway of at least one predictable field out of the fields of the external and internal headers, reception by the radio communications equipment from the gateway of at least one predictable field of the external header, a phase of transmission of at least one data packet comprising: the deletion of the external and internal headers of at least one data packet, the generation, in at least one data packet, of a header of level lower than a network layer comprising at least one non-predictable field of the internal header, the transmission of at least one data packet.

10 Claims, 3 Drawing Sheets

DATA COMMUNICATION METHOD BETWEEN A ROAMING RADIO EQUIPMENT ITEM AND A NETWORK ACCESS GATEWAY

CROSS-REFERENCE TO RELATED APPLICATION

This application claims priority to foreign French patent application No. FR 1402624, filed on Nov. 21, 2014, the disclosure of which is incorporated by reference in its entirety.

FIELD OF THE INVENTION

The invention relates to the field of the communication systems in which a roaming mobile carrier is required to communicate with a telecommunication network. The communication system embedded in the roaming carrier is required to connect to the network through different network access gateways depending on the position of the carrier. The invention thus relates to the telecommunication networks in which mobility is managed at the network level. The invention relates finally to the field of optimizing the use of the bandwidth on the radio link between the mobile carrier and the network access gateway.

The invention relates more specifically to a communication method between a roaming radio equipment item and a network access gateway which allows for an optimization of the spectral resources consumed on this communication link.

BACKGROUND

FIG. 1 represents an example of a communication system in which a mobile carrier P, for example an aircraft, communicates with a network of fixed infrastructure R. Such a system is for example adapted to implement the ATN (Aeronautical Telecommunication Network) standard specified by the International Civil Aviation Organization (ICAO).

The mobile carrier P comprises at least one onboard embedded radio communications equipment item 101 which enables it to be connected to an onboard local area network 102.

The mobile carrier P connects to the fixed infrastructure network R through an access gateway 103, 104, 105. This gateway establishes a radio link with the airborne communications equipment item 101 according to a radio communication technology, for example a satellite communication link. The mobile carrier P connects to an access gateway 103, 104, 105 which is within its radio range. Thus, the access to the network R can be made via different access gateways 103, 104, 105. Each access gateway is connected to a home agent 106, 107, which is an entity of the network R whose role is to manage the mobility of the equipment items that want to connect to the network via the access gateways. Each radio communications equipment item 101 is associated with a home agent 106, 107. A home agent 106 can be implemented in an equipment item distinct from the access gateway 103 while being linked to this gateway or be implemented in the same equipment item as the access gateway 103. One and the same home agent 106 can be linked to a plurality of access gateways 103, 104, 105.

In the example of FIG. 1, a communication link between the embedded equipment item 101 and a remote terminal 108 connected to the network R is considered by way of illustration. The mobile carrier P moves from a first zone within radio range of a first gateway 105 to a second zone within radio range of a second gateway 103.

To establish and maintain the communication between the embedded equipment item 101 and the remote terminal 108 regardless of the position of the mobile carrier P, two network links are established.

A first network link is established between the embedded equipment item 101 and the remote terminal 108. The link is established from a permanent network address of the embedded equipment item 101 and a permanent network address of the remote terminal 108.

In order to manage the mobility of the carrier P, a second network link is established in tunnel mode between a temporary network address of the embedded equipment item 101, which belongs to the same network as the access gateway, and the network address of the home agent 106 responsible for the mobility management. The temporary network address is allocated by the network access gateway.

This mobility management mechanism makes it possible to avoid the implementation of complex routing mechanisms when the carrier P changes access gateway during its movement.

However, the use of two network links, including one through a tunnel, for the same point-to-point communication, leads to drawbacks. A transmitted data packet comprises two network headers of significant size, in particular for networks that use the IPv6 protocol. An IPv6 header has a size of 40 octets. Now, the radio link between the mobile carrier P and the network access gateway is more often than not a link with low available bandwidth, in particular for the case of an aeronautical communication link. The use of two IPv6 headers to establish a communication link leads to a non-optimal use of the resources available on the radio channel because the introduction of two network headers in each transmitted packet accordingly reduces the bandwidth available for the useful data transmitted.

One known solution which makes it possible to optimize the radio resources in the case of transmissions based on the IP network protocol consists in using a network header compression mechanism, such as the RoHC (Robust Header Compression) mechanism standardized by the IETF organization under the reference RFC3095.

This mechanism makes it possible to reduce the size of the network header but does present other drawbacks. It requires an initial phase of preliminary connection of the hosts for each interchange session and is complex to implement. Furthermore, it also requires the synchronization to be maintained between the contexts saved by each host to be able to correctly operate the decompression of the headers and is therefore sensitive to any desynchronization phenomenon.

SUMMARY OF THE INVENTION

The invention proposes a transmission method between a radio equipment item embedded in a mobile carrier and an access gateway to a fixed network which makes it possible to optimize the available bandwidth resources.

The solution proposed by the invention consists in deleting the transmission of the predictable fields of the network headers and in reconstructing, in reception, the deleted headers.

The subject of the invention is a data communication method between a radio communications equipment item intended to be embedded in a roaming carrier, and a gateway connected to a network, the data being organized in the form of packets comprising at least one first network header, called internal header, corresponding to a network link between a local communications equipment item belonging to a local area network embedded onboard said carrier and a remote communications equipment item connected to said network and a second network header, called external header, corresponding to a network link between said radio communications equipment item and a home agent connected to the gateway, said method being characterized in that it comprises at least:

an initial information exchange phase comprising:
the transmission by the radio communications equipment item to the gateway or the reception by the gateway from the radio communications equipment item of at least one predictable field out of the fields of the external header and of the internal header,
the reception by the radio communications equipment item from the gateway or the transmission by the gateway to the radio communications equipment item of at least one predictable field of the external header, a phase of transmission of at least one data packet comprising:
the deletion of the external header and of the internal header of said at least one data packet,
the generation, in said at least one data packet, of a header of level lower than a network layer comprising at least one non-predictable field out of the fields of the internal header,
the transmission of said at least one data packet.

Another subject of the invention is a data communication method between a radio communications equipment item intended to be embedded in a roaming carrier, and a gateway connected to a network, the data being organized in the form of packets comprising at least one first network header, called internal header, corresponding to a network link between a local communications equipment item belonging to a local area network embedded onboard said carrier and a remote communications equipment item connected to said network and a second network header, called external header, corresponding to a network link between said radio communications equipment item and a home agent connected to the gateway, said method being characterized in that it comprises at least:

an initial information exchange phase comprising:
the transmission by the radio communications equipment item to the gateway or the reception by the gateway from the radio communications equipment item of at least one predictable field out of the fields of the external header and of the internal header,
the reception by the radio communications equipment item from the gateway or the transmission by the gateway to the radio communications equipment item of at least one predictable field of the external header, a data reception phase comprising:
the reception of at least one data packet comprising a header of level lower than a network layer,
the reconstruction, in the data packet, of an internal network header at least from at least one predictable field transmitted during the initial phase and at least one non-predictable field included in the header of level lower than a network layer of said data packet, said internal network header corresponding to a network link between a local communications equipment item belonging to a local area network embedded onboard said carrier and a remote communications equipment item connected to said network, the reconstruction, in the data packet, of an external network header at least from at least one predictable field transmitted during the initial phase, said external network header corresponding to a network link between said radio communications equipment item and a home agent connected to the gateway,
the deletion of the header of level lower than a network layer in said data packet.

According to a particular aspect of the invention, the predictable fields of the internal header comprise at least a prefix of the permanent network address of the radio communications equipment item.

According to a particular aspect of the invention, the non-predictable fields of the internal header comprise at least the network address of the remote communications equipment item connected to said network.

According to a particular aspect of the invention, the non-predictable fields of the internal header comprise the suffix of the permanent network address of the radio communications equipment item.

According to a particular aspect of the invention, the predictable fields of the external header comprise at least a part of the temporary network address of the radio communications equipment item allocated by the gateway and the network address of the home agent.

According to a particular aspect of the invention, the temporary network address of the radio communications equipment item is made up of a prefix allocated by the gateway and of a suffix generated from an identifier specific to the radio communications equipment item, and the initial information exchange phase comprises:

the transmission by the radio communications equipment item to the gateway or the reception by the gateway from the radio communications equipment item of said identifier,
the reception by the radio communications equipment item from the gateway or the transmission by the gateway to the radio communications equipment item of said prefix allocated by the gateway.

Yet another subject of the invention is a computer programme comprising instructions for the execution of the data transmission method and/or of the data reception method according to the invention, when the programme is executed by a processor.

Yet another subject of the invention is a radio communications equipment item intended to be embedded in a roaming carrier comprising communication means suitable for observing a network architecture according to a layered model comprising at least a network layer and a link layer, said communication means being configured to execute the data communication method according to the invention.

Yet another subject of the invention is a network gateway intended to be connected to a network via a home agent of the network and comprising communication means suitable for observing a network architecture according to a layered model comprising at least a network layer and a link layer, said communication means being configured to execute the data communication method according to the invention.

BRIEF DESCRIPTION OF THE DRAWINGS

Other features and advantages of the present invention will become more apparent on reading the following description in relation to the attached drawings which represent.

DETAILED DESCRIPTION

Figure 1:
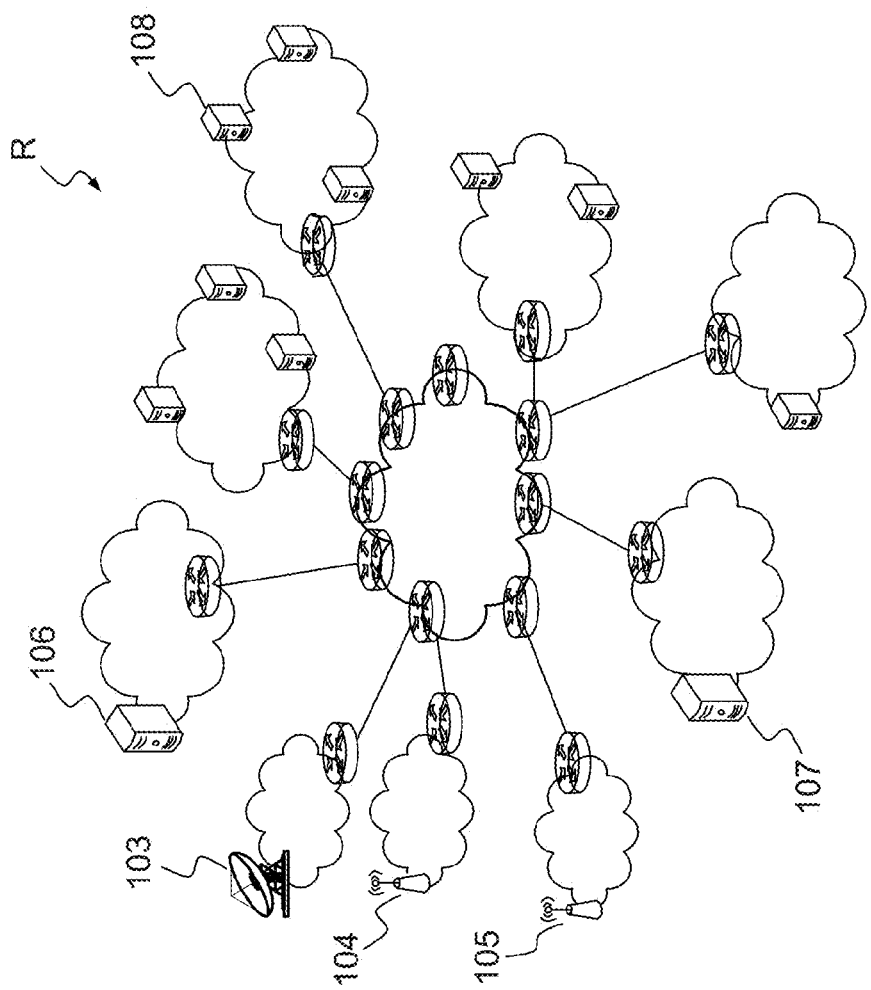
FIG. 1, a block diagram of a telecommunication network in which a mobile carrier can connect to a fixed infrastructure network, FIG. 2, a diagram illustrating the protocol implementation of a communication link in the network of FIG. 1, FIG. 3, a flow diagram illustrating the data transmission method according to the invention.
Figure 1:
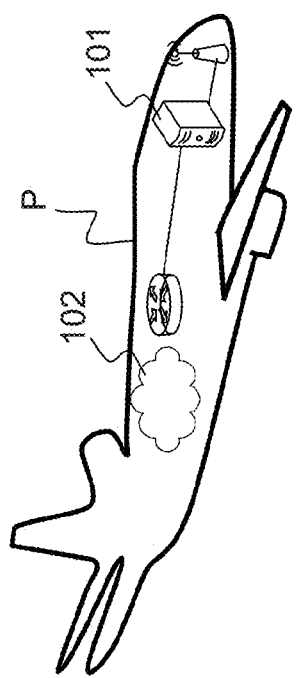
Figure 2:
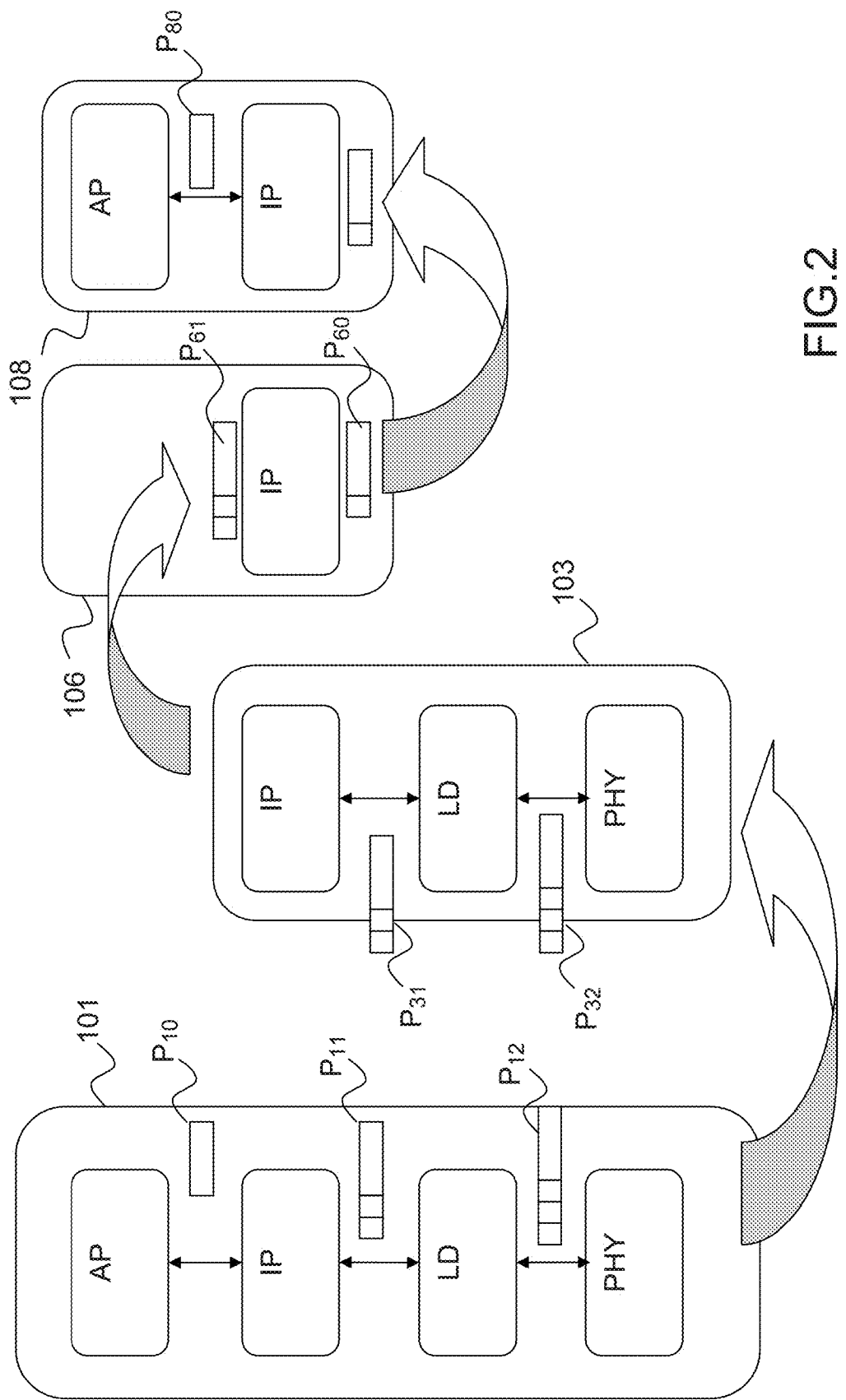

FIG. 2 schematically illustrates the mechanisms implemented in a transmission between the embedded communications equipment item 101 and a remote terminal 108 connected to the network R.

The network R uses a protocol architecture based on a model of the type comprising at least four layers: an application layer AP, a network layer IP, a data link layer LD and a physical layer PHY. The protocol architecture model is notably inspired by the OSI (Open Systems Interconnection) model which comprises seven layers.

FIG. 2 shows a transmission initiated by the embedded equipment item 101 intended for the remote terminal 108. The transmission mechanism applied for a communication from the remote terminal 108 to the embedded equipment item 101 is similar.

A data packet $P_{10}$ is generated at the application layer of the embedded equipment item 101 or of an equipment item connected to the local area network embedded in the mobile carrier P. The generated packet $P_{10}$ is transmitted to the IP network layer to be encapsulated twice in succession in a network packet. To this end, a first internal network header is added which notably comprises the permanent network address of the source radio equipment item 101 and the permanent network address of the destination remote terminal 108. A second network header is also added to establish the network link in tunnel mode between the radio equipment item 101 and the home agent 106. The second external network header comprises a temporary network address of the radio equipment item 101, allocated by the gateway 103, and the permanent network address of the home agent 106. The internal network header and the external network header are, for example, IPv6 headers.

The duly constructed network packet $P_{11}$ is transmitted to the data link layer which also adds a specific header to generate a new packet $P_{12}$ which is transmitted to the physical layer then transmitted by radio channel to the gateway 103.

The gateway 103 de-encapsulates the received packet $P_{32}$ to the level of the IP network layer. At this level, the gateway 103 transmits the network packet $P_{61}$ to the home agent 106 which deletes the external network header and communicates the network packet $P_{60}$ to the destination terminal 108 which recovers the application packet $P_{80}$.

The use of a second IP tunnel between the radio equipment item 101 and the home agent 108 allows for the management of the mobility of the carrier P which can connect to different network access gateways. The home agent 106 is unique for each carrier P which makes it possible to effectively manage the routing of the packets to their destination regardless of the position of the carrier P.

As indicated in the preamble, the addition of two network headers to each packet generates an overconsumption of the bandwidth of the radio link between the carrier P and the gateway 103 to the detriment of the bit rate allocated to the useful data.

The invention proposes a mechanism which solves this problem.

Figure 3:
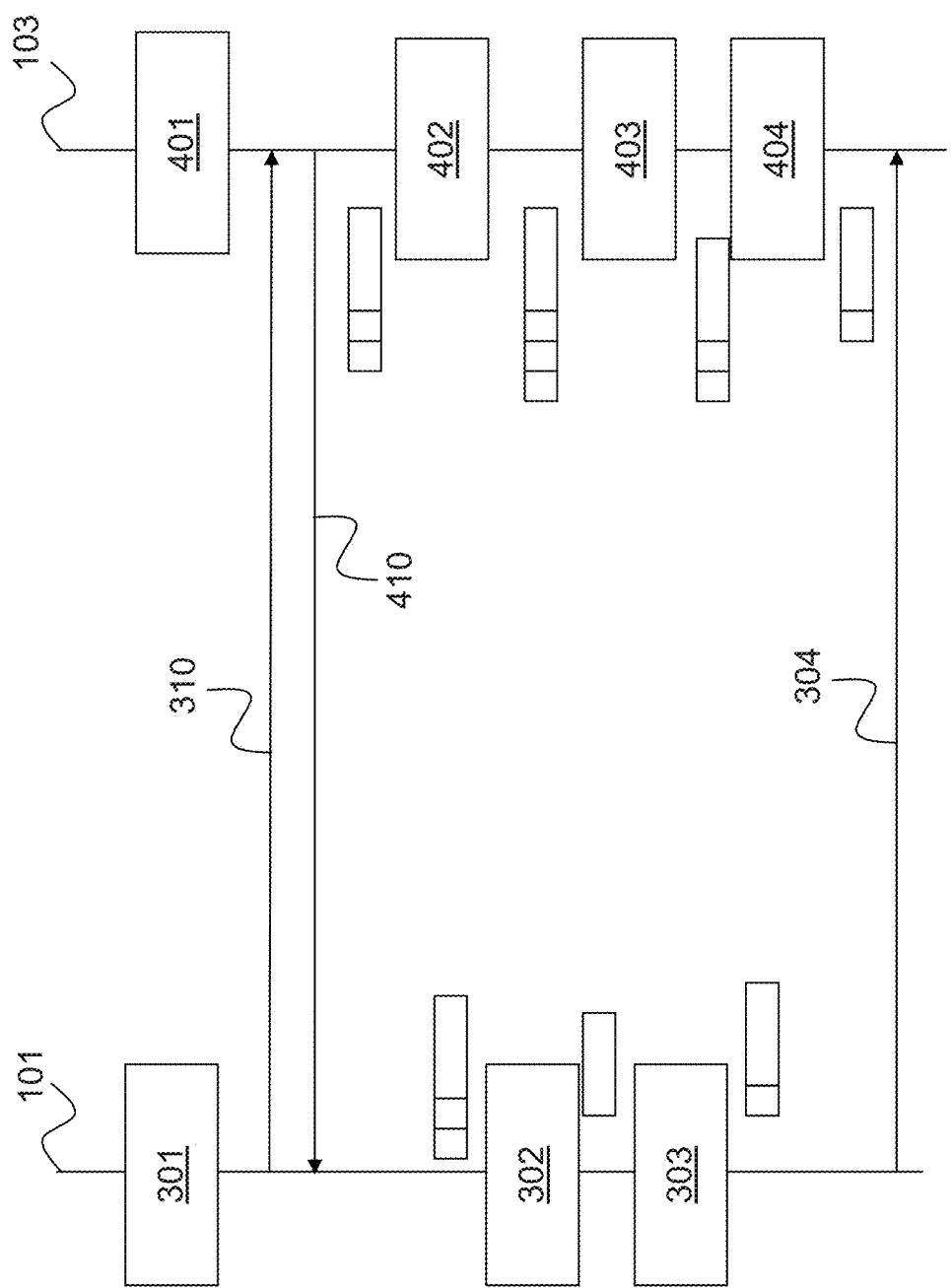

FIG. 3 illustrates the data transmission method according to the invention.

The method comprises a first initial information exchange phase between the embedded radio equipment item 101 and the gateway 103 followed by a second data transmission phase.

The first information exchange phase takes place when the carrier P wants to register on the network R with the gateway 103 that it is closest to and within radio range.

The radio equipment item 101 first identifies, in the two network headers of the packets to be transmitted, the fields that are predictable in any transmission from or to the radio equipment item 101 or the local area network embedded in the carrier P. A "predictable field" should be understood here to mean a header field whose value is fixed or constant regardless of whether the communication is from or to the radio equipment item 101.

In the internal network header, a predictable field is the permanent address field of the radio equipment item 101 or the prefix of this permanent address in the case where its suffix is used to allocate permanent network addressed to different equipment items connected within a local area network embedded in the carrier P. The address of the remote terminal 108 is generally non-predictable since there is no a priori knowledge of the terminal with which the radio equipment item 101 may be required to communicate. It can however also be predicted in the particular case where the carrier P systematically communicates with one and the same remote terminal.

In the external network header, a predictable field is the address field of the home agent 106. In effect, there is a unique pairing between each roaming carrier P and a home agent responsible for managing the mobility of this carrier in the network R.

The temporary network address of the radio equipment item 101, also included in the external network header, is allocated by the access gateway 103 and is therefore also predictable because all the communications involving the radio equipment item 101 will use this temporary address.

In a particular embodiment of the invention, only a prefix of the temporary network address is allocated by the access gateway. The suffix of the temporary network address is determined from the prefix and from an identifier specific to the radio equipment item 101, for example an identifier of the EUI-64 type. The access gateway transmits the suffix to the radio equipment item which can then generate all of the temporary network address from the identifier.

To sum up, in the initial exchange phase of the method according to the invention, the radio equipment item 101 identifies 301 the predictable fields that it knows in the two network headers then transmits them to the gateway 103. Similarly, the gateway 103 identifies 401 the predictable fields that it knows and transmits them to the radio equipment item 101.

On completion of the initial phase, the two entities 101,103 directly involved in the radio link each have a local copy of the predictable fields of the two network headers.

In a second data transmission phase, a data packet $P_{11}$, from the network layer, is intercepted at the level of the data link layer LD. The two network headers are deleted 302. A link header is added 303 to the packet. It includes the non-predictable fields of the two network headers. For example, it comprises the destination address of the remote terminal 108. It can also comprise the suffix of the permanent network address of the radio equipment item 101 when this suffix is used to allocate a number of permanent addresses to equipment items situated onboard the carrier P, in other words when a number of equipment items onboard the carrier are addressable within the prefix allocated in the registration of the carrier with the gateway.

The packet including the link header generated according to the invention is then transmitted 304 to the physical layer then transmitted by radio channel to the gateway 103.

On reception of the packet, the following processing operations are performed by the gateway at the level of the data link layer LD. The internal network header is reconstructed 404 from the non-predictable fields contained in the link header and from the predictable fields exchanged during the initial phase. The external network header is reconstructed 403 from the predictable fields exchanged during the initial phase. Then, the link header is deleted 402.

The transmission mechanism according to the invention is described in FIG. 2 in a nonlimiting example for which the communication is initiated by the embedded equipment item 101 to the remote terminal 108. However, the transmission can also be performed in the reverse direction. In the latter case, the processing operations performed respectively by the radio equipment item 101 and by the gateway 103 are reversed.

Without departing from the scope of the invention, the transmission method according to the invention can also be implemented at the level of the physical layer or of any abstraction layer situated at a level lower than the network layer.

The invention applies advantageously when it is associated with the IPv6 protocol because, in this case, it allows for a significant gain on the transmission resources saved by the deletion of the IPv6 headers. However, the invention applies also to the IPv4 protocol and to any network protocol that allows for the unique addressing of the hosts within a network.

During the phase of reconstruction of the network headers, the header fields other than the source address and the destination address can be reconstructed from fields contained in the link header or from default values or even from values exchanged during the initial exchange phase.

The method according to the invention can be implemented from hardware and/or software elements. It can notably be implemented as a computer programme comprising instructions for its execution. The computer programme can be stored on a processor-readable storage medium. The medium can be electronic, magnetic, optical or electromagnetic.

In particular, the invention can be implemented by a device comprising a processor and a memory. The processor can be a generic processor, a specific processor, an application-specific integrated circuit (also known by the acronym ASIC) or a field-programmable gate array (also known by the acronym FPGA).

The device can use one or more dedicated electronic circuits or a general-purpose circuit. The technique of the invention can be implemented on a reprogrammable computation machine (a processor or a microcontroller for example) executing a programme comprising a sequence of instructions, or on a dedicated computation machine (for example a set of logic gates such as an FPGA or an ASIC, or any other hardware module).

According to one embodiment, the device comprises at least one computer-readable storage medium (RAM, ROM, EEPROM, flash memory or other memory technology, CD-ROM, DVD or another optical disk medium, magnetic cassette, magnetic tape, magnetic storage disk or other storage device, or another non-transient computer-readable storage medium) coded with a computer programme (that is to say a number of executable instructions) which, when executed on a processor or a number of processors, performs the functions of the embodiments of the invention described previously.

The invention can be implemented in the radio communications equipment item 101 embedded in the roaming carrier and in the network access gateway 103. The invention is implemented at the level of the data link layer or of any abstraction layer situated at a level lower than the network layer.

To give an example of hardware architecture adapted to implement the invention, a device according to the invention can comprise a communication bus to which are linked a central processing unit or microprocessor (CPU), a read-only memory (ROM) that can include the programmes necessary for the implementation of the invention; a random access memory or cache memory (RAM) comprising registers adapted to store variables and parameters created and modified during the execution of the abovementioned programmes; and a communication interface or I/O (input/output) adapted to transmit and receive data.

The reference to a computer programme which, when it is executed, performs any one of the functions described previously, is not limited to an application programme running on a single host computer. On the contrary, the terms computer programme and software are used here in a general sense to refer to any type of computer code (for example, application software, firmware, microcode, or any other form of computer instruction) which can be used to programme one or more processors to implement aspects of the techniques described here. The computer means or resources can notably be distributed (cloud computing), possibly according to peer-to-peer technologies. The software code can be executed on any appropriate processor (for example, a microprocessor) or processor core or a set of processors, whether they are provided in a single computation device or distributed between a plurality of computation devices (for example as possibly accessible in the environment of the device). The executable code of each programme making it possible for the programmable device to implement the processes according to the invention can be stored, for example, in the hard disk or in read-only memory. Generally, the programme or programmes will be able to be loaded into one of the storage means of the device before being executed. The central processing unit can control and direct the execution of the instructions or portions of software code of the programme or programmes according to the invention, instructions which are stored in the hard disk or in the read-only memory or even in the other abovementioned storage elements.

The invention has the advantage of economizing on the signalling data transmitted over the radio link to the benefit of a possible increase in the useful data bit rate.

In particular, when the invention is applied to the IPv6 protocol, the gain provided by the deletion of the two network headers varies from 56 to 64 octets, even 80 octets in certain cases.

Another advantage linked to the invention is that the deletion of the predictable fields from the headers of each packet transmitted over the radio link makes it possible to avoid having these fields effected by transmission errors linked to the propagation channel.

The invention claimed is:

1. A data communication method between a radio communications equipment item embeddable in a roaming carrier, and a gateway connected to a network, the data being organized in the form of packets comprising at least one first network header, called internal header, corresponding to a network link between a local communications equipment item belonging to a local area network embedded onboard said carrier and a remote communications equipment item connected to said network and a second network header, called external header, corresponding to a network link between said radio communications equipment item and a home agent connected to the gateway, said method comprising at least:
- an initial information exchange phase executed prior to a phase of transmission of at least one data packet, the initial information exchange phase comprising:
  - the transmission by the radio communications equipment item to the gateway or the reception by the gateway from the radio communications equipment item of at least one predictable field out of the fields of the external header and of the internal header, and
  - the reception by the radio communications equipment item from the gateway or the transmission by the gateway to the radio communications equipment item of at least one predictable field of the external header,
- the phase of transmission of at least one data packet comprising:
  - the deletion of the external header and of the internal header of said at least one data packet,
  - the generation, in said at least one data packet, of a header of level lower than a network layer comprising at least one non-predictable field out of the fields of the internal header, and
  - the transmission of said at least one data packet.

2. A data communication method between a radio communications equipment item embeddable in a roaming carrier, and a gateway connected to a network, the data being organized in the form of packets comprising at least one first network header, called internal header, corresponding to a network link between a local communications equipment item belonging to a local area network embedded onboard said carrier and a remote communications equipment item connected to said network and a second network header, called external header, corresponding to a network link between said radio communications equipment item and a home agent connected to the gateway, said method comprising at least:
- an initial information exchange phase comprising:
  - the transmission by the radio communications equipment item to the gateway or the reception by the gateway from the radio communications equipment item of at least one predictable field out of the fields of the external header and of the internal header,
  - the reception by the radio communications equipment item from the gateway or the transmission by the gateway to the radio communications equipment item of at least one predictable field of the external header, a data reception phase comprising:
    - the reception of at least one data packet comprising a header of level lower than a network layer,
    - the reconstruction, in the data packet, of an internal network header at least from at least one predictable field transmitted during the initial phase and at least one non-predictable field included in the header of level lower than a network layer of said data packet, said internal network header corresponding to a network link between a local communications equipment item belonging to a local area network embedded onboard said carrier and a remote communications equipment item connected to said network,
    - the reconstruction, in the data packet, of an external network header at least from at least one predictable field transmitted during the initial phase, said external network header corresponding to a network link between said radio communications equipment item and a home agent connected to the gateway,
    - the deletion of the header of level lower than a network layer in said data packet.

3. The data communication method according to claim 1, wherein the predictable fields of the internal header comprise at least a prefix of the permanent network address of the radio communications equipment item.

4. The data communication method according to claim 1, wherein the non-predictable fields of the internal header comprise at least the network address of the remote communications equipment item connected to said network.

5. The data communication method according to claim 4, wherein the non-predictable fields of the internal header comprise the suffix of the permanent network address of the radio communications equipment item.

6. The data communication method according to claim 1, wherein the predictable fields of the external header comprise at least a part of the temporary network address of the radio communications equipment item allocated by the gateway and the network address of the home agent.

7. The data communication method according to claim 5, wherein:
- the temporary network address of the radio communications equipment item is made up of a prefix allocated by the gateway and of a suffix generated from an identifier specific to the radio communications equipment item,
- the initial information exchange phase comprises:
  - the transmission by the radio communications equipment item to the gateway or the reception by the gateway from the radio communications equipment item of said identifier,
  - the reception by the radio communications equipment item from the gateway or the transmission by the gateway to the radio communications equipment item of said prefix allocated by the gateway.

8. A non-transitory computer readable medium having a computer program comprising instructions for the execution of the data transmission method and/or of the data reception method according to claim 1, when the computer program is executed by a processor.

9. A radio communications equipment item embeddable in a roaming carrier configured to observe a transmitter having a network architecture according to a layered model comprising at least a network layer and a link layer, said transmitter configured to execute:
- a data communication method between the radio communications equipment item, and a gateway connected to a network, the data being organized in the form of packets comprising at least one first network header, called internal header, corresponding to a network link between a local communications equipment item belonging to a local area network embedded onboard said carrier and a remote communications equipment item connected to said network and a second network header, called external header, corresponding to a network link between said radio communications equipment item and a home agent connected to the gateway, said method comprising at least:

an initial information exchange phase executed prior to a phase of transmission of at least one data packet, the initial information exchange phase comprising:

the transmission by the radio communications equipment item to the gateway or the reception by the gateway from the radio communications equipment item of at least one predictable field out of the fields of the external header and of the internal header, the reception by the radio communications equipment item from the gateway or the transmission by the gateway to the radio communications equipment item of at least one predictable field of the external header, the phase of transmission of at least one data packet comprising:

the deletion of the external header and of the internal header of said at least one data packet, the generation, in said at least one data packet, of a header of level lower than a network layer comprising at least one non-predictable field out of the fields of the internal header, the transmission of said at least one data packet.

10. A network gateway to be connected to a network via a home agent of the network and comprising a transmitter having a network architecture according to a layered model comprising at least a network layer and a link layer, said transmitter being configured to execute the data communication method according to claim 1.

* * * * *